N. Palmer,
Straw Carrier,

№ 47,746.        Patented May. 16, 1865.

Witnesses,
Lemuel W. Serrell
Chas. H. Smith

Inventor,
N. Palmer

UNITED STATES PATENT OFFICE.

NELSON PALMER, OF HUDSON, NEW YORK.

IMPROVEMENT IN THRASHING-MACHINES.

Specification forming part of Letters Patent No. 47,746, dated May 16, 1865.

*To all whom it may concern:*

Be it known that I, NELSON PALMER, of Hudson, in the county of Columbia and State of New York, have invented, made, and applied to use a certain new and useful Improvement in Thrashing-Machines; and I do hereby declare the following to be a full, clear, and exact description of the said invention, reference being had to the annexed drawings, making part of this specification, wherein—

Figure 1:
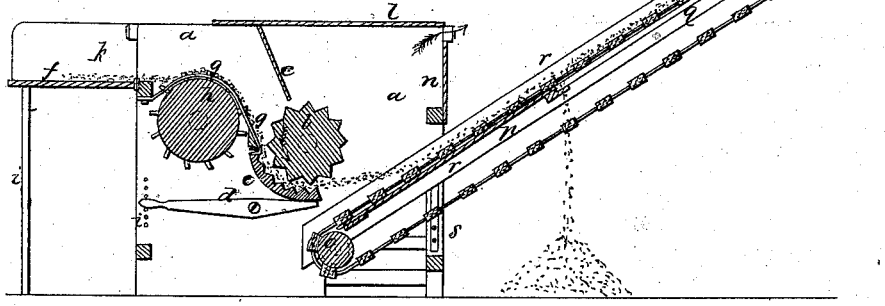
Figure 2:
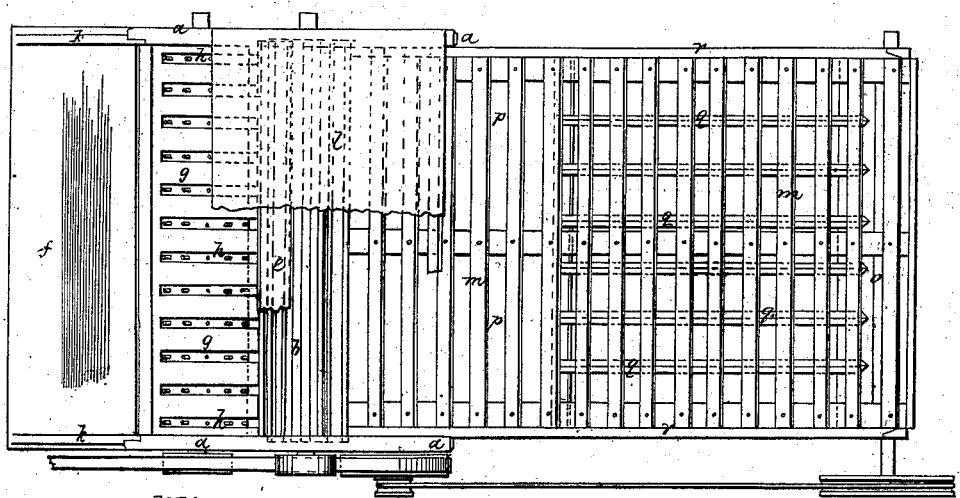

Figure 1 is a longitudinal section of my thrashing-machine crosswise of the thrashing-cylinder, and Fig. 2 is a plan of said machine with the cover on top of the case removed.

Similar marks of reference denote the same parts.

The nature of my said invention consists in a ribbed or corrugated cylinder receiving the grain, straw, or stalks lengthwise or nearly parallel to the said ribs or corrugations, and thrashing out the grain or seeds against a ribbed or grooved rubber. The straw or stalks are delivered upon an apron that acts to separate the grains or seeds, allowing them to fall away while the straw is delivered in a condition to be bound into bundles, as the thrashing operation does not injure the straw, but leaves the said straw nearly in the same condition as flail-thrashed straw.

In the drawings, $a$ represents a frame of suitable size receiving the corrugated or ribbed thrashing-cylinder $b$. This cylinder is to be long enough to receive the straw or stalks widthwise, so that they shall pass into the machine transversely or nearly parallel to the said thrashing-cylinder. Below the said threshing-cylinder $b$, and partially at one side thereof, I make use of a concave rubber, $c$, that is attached at its upper edge or corners by hinges or joints, so that it may be moved nearer to or farther from the thrashing-cylinder $b$, according to the character of grain or seeds to be thrashed. For adjusting this rubber $c$, I employ levers $d$ on fulcrums on the frame $a$, and 1 are pins at the outer ends of the levers, entering holes in the frame, to retain the parts when adjusted. This concave rubber may be adjusted by screws or in any convenient manner.

$e$ is a board to direct the straw as it passes in between the rubber $c$ and thrasher $b$ and prevent the grain, straw, or stalks falling down on the opposite side of the thrasher $b$.

The grain or stalks are to be fed into the thrashing-machine in any convenient manner. I however prefer and use a table, $f$, to receive the bundle of grain or other material to be thrashed, and upon which it is separated and loosened.

$g$ is a slotted grate extending from the table $f$ to the upper edge of the rubber $c$, and curved, as shown. Beneath this grate is the feeding-cylinder $h$, that is on an axis parallel or nearly so to the axis of the thrasher $b$, and is provided with ranges of teeth or spikes that as the cylinder $h$ revolves come above the surface of the grate $g$ sufficiently to take the grain or other material and carry it transversely to the thrashing-cylinder. The shape of the grate $g$ is such that the ends of the spikes or teeth of the cylinder $h$ pass below the surface of said grate adjacent to the rubber $c$. Supports $i$ and end pieces, $k$, may be provided to the table $f$ to facilitate the handling of the grain. Over the thrasher is a cover, $l$, to inclose the parts, and an endless apron, $m$, is provided to convey away the straw or stalks.

$n$ is a division or wind board, between which and the cover $l$ is a mouth through which the dust is allowed to escape, and the grain and straw are thrown out below the wind-board $n$ upon the endless apron $m$. The apron $m$ is sustained by the rollers $o\ o$, one of which is propelled by a belt from the thrashing-machine, and the apron itself is formed by transverse slats attached to endless belts in the usual manner. Beneath the said apron, at the lower end thereof, is a table, $p$, and this serves to arrest the momentum of grain and straw or stalks as thrown out from the thrasher, and an apron may hang down from the lower edge of the board $n$ to check the momentum of said straw and grain as they issue from the thrasher to the apron. At the upper end of the table $p$ slats $q$ are fitted that extend upward and parallel with the edges of the belt to sustain the straw while carried up by the apron $m$, and at the same time allow the grain to fall away beneath the apron, while the straw itself is carried to the upper end of the apron and delivered in a form adapted to being bound into bundles.

The apron $m$ may be fitted on a frame, $r$, so that it can be detached, if desired, from the frame of the thrashing-machine. I have represented such apron-frame $r$ as entered between the main frame $a$ and held up by buttons $s$, turned up beneath the side pieces of such frame $r$.

The apron may be shaken to shake out the grains or seeds, for which purpose the slats of said apron may be drawn over stationary inclines or triangular blocks on the frame $r$ at the ends of said slats.

The belts for driving the cylinders $b$ and $h$ and the apron $m$ may be arranged in any desired manner, and the thrashing-cylinder and concave may be of wood or metal, or may be of wood covered by sheet-metal or of slats secured upon heads or a cylinder.

What I claim, and desire to secure by Letters Patent, is—

1. The method herein specified of thrashing grain transversely by the combined action of the feeding device, the corrugated cylinder, and the curved rubber, as set forth.

2. A revolving cylinder armed with teeth or spikes, in combination with the guard $g$ for feeding in the straw or stalks transversely to the thrashing mechanism, substantially as specified.

3. The guard $g$, in combination with the feeding-cylinder $h$, thrashing-cylinder $b$, and concave rubber $c$, substantially as specified.

In witness whereof I have hereunto set my signature this 27th day of January, 1865.

N. PALMER.

Witnesses:
LEMUEL W. SERRELL,
CHAS. H. SMITH.